United States Patent
Mohamadi

(10) Patent No.: US 7,697,958 B2
(45) Date of Patent: Apr. 13, 2010

(54) WIRELESS REPEATER

(76) Inventor: Farrokh Mohamadi, 8 Halley, Irvine, CA (US) 92612-3797

( * ) Notice: Subject to any disclaimer, the term of this patent is extended or adjusted under 35 U.S.C. 154(b) by 1248 days.

(21) Appl. No.: 11/203,696

(22) Filed: Aug. 15, 2005

(65) Prior Publication Data

US 2006/0040615 A1 Feb. 23, 2006

Related U.S. Application Data

(63) Continuation-in-part of application No. 10/942,383, filed on Sep. 16, 2004.

(60) Provisional application No. 60/602,220, filed on Aug. 16, 2004.

(51) Int. Cl.
*H04M 1/00* (2006.01)
(52) U.S. Cl. .................... 455/562.1; 455/11.1; 455/24; 455/562
(58) Field of Classification Search ............... 455/562.1
See application file for complete search history.

(56) References Cited

U.S. PATENT DOCUMENTS

| 6,934,511 B1 * | 8/2005 | Lovinggood et al. ....... 455/11.1 |
| 2001/0016504 A1 * | 8/2001 | Dam et al. ................... 455/562 |
| 2004/0157604 A1 | 8/2004 | Sharony et al. |

OTHER PUBLICATIONS

Farrokh Mohamadi, Si Integration with Millimeter Wave Phased Array Antenna, RF Design, Feb. 2004, pp. 40-48.
Farrokh Mohamadi, Critical Data Timing in Distributed Systems, Defense Electronics, May 2004, pp. 13-18.
V. Sirivastava, Smart Antennas & Power Management in Wireless Networks, Virginia Polytechnic Institute and State University, 2002.

* cited by examiner

*Primary Examiner*—Duc Nguyen
*Assistant Examiner*—Ajibola Akinyemi
(74) *Attorney, Agent, or Firm*—Haynes & Boone, LLP.

(57) ABSTRACT

In one embodiment, a beamforming RF repeater includes: a beamforming controller; a first array of antennas organized into a plurality of first sub-arrays; a plurality of first RF combiner and decombiner circuits corresponding to the plurality of first sub-arrays, wherein each first RF combiner and decombiner circuit is configured to phase shift in the RF domain a received RF signal from the corresponding first sub-array according to a first beamforming command from the beamforming controller such that a first combined signal formed from the phase-shifted signals from the plurality of first RF combiner and decombiner circuits is received in a first desired beam direction; a second array of antennas organized into a plurality of second sub-arrays; and a plurality of second RF combiner and decombiner circuits corresponding to the plurality of second sub-arrays, wherein each second RF combiner and decombiner circuit is configured to phase shift in the RF domain the first combined signal according to a second beamforming command from the beamforming controller such that a transmitted signal from the second array of antennas is transmitted in a second desired beam direction. Because the beamforming is in the RF domain, the beamforming controller need not demodulate the repeated RF signal, thereby avoiding the necessity of any baseband processing.

14 Claims, 7 Drawing Sheets

WIRELESS REPEATER

RELATED APPLICATIONS

This application claims the benefit of U.S. Provisional Application No. 60/602,220, filed Aug. 16, 2004. In addition, this application is a continuation-in-part of U.S. Ser. No. 10/942,383, filed Sep. 16, 2004. The contents of the aforementioned applications are hereby incorporated by reference in their entirety.

TECHNICAL FIELD

The present invention relates generally to beamforming applications, and more particularly to a beamforming wireless repeater.

BACKGROUND

Conventional high-frequency antennas are often cumbersome to manufacture. For example, antennas designed for 100 GHz bandwidths typically use machined waveguides as feed structures, requiring expensive micro-machining and hand-tuning. Not only are these structures difficult and expensive to manufacture, they are also incompatible with integration to standard semiconductor processes.

As is the case with individual conventional high-frequency antennas, beamforming arrays of such antennas are also generally difficult and expensive to manufacture. Conventional beamforming arrays require complicated feed structures and phase-shifters that are impractical to be implemented in a semiconductor-based design due to its cost, power consumption and deficiency in electrical characteristics such as insertion loss and quantization noise levels. In addition, conventional beamforming arrays become incompatible with digital signal processing techniques as the operating frequency is increased. For example, at the higher data rates enabled by high frequency operation, multipath fading and cross-interference becomes a serious issue. Adaptive beamforming techniques are known to combat these problems. But adaptive beamforming for transmission at 10 GHz or higher frequencies requires massively parallel utilization of A/D and D/A converters.

The need for overhead intelligence, surveillance, and reconnaissance is growing in both civilian and military applications. Terrain obstacles (both urban and rural) make line-of-sight radio communication between legacy military radios problematic. A wireless repeater having beamforming capabilities would enable non-line-of-sight (NLOS) communication, thereby significantly enhancing signal fidelity and integrity. In addition, beamforming provides inherent resistance to signal jamming and multi-path interference. However, the aforementioned problems make conventional wireless repeaters costly and unreliable. Accordingly, there is a need in the art for improved beamforming wireless repeaters.

SUMMARY

In accordance with one aspect of the invention, a beamforming RF repeater includes: a beamforming controller; a first array of antennas organized into a plurality of first sub-arrays; a plurality of first RF combiner and decombiner circuits corresponding to the plurality of first sub-arrays, wherein each first RF combiner and decombiner circuit is configured to phase shift in the RF domain a received RF signal from the corresponding first sub-array according to a first beamforming command from the beamforming controller such that a first combined signal formed from the phase-shifted signals from the plurality of first RF combiner and decombiner circuits is received in a first desired beam direction; a second array of antennas organized into a plurality of second sub-arrays; and a plurality of second RF combiner and decombiner circuits corresponding to the plurality of second sub-arrays, wherein each second RF combiner and decombiner circuit is configured to phase shift in the RF domain the first combined signal according to a second beamforming command from the beamforming controller such that a transmitted signal from the second array of antennas is transmitted in a second desired beam direction. Because the beamforming for the beamforming repeater is thus in the RF domain, the beamforming controller need not demodulate the repeated RF signal, thereby avoiding the necessity of any baseband processing. Moreover, a single RF channel may be used to couple the first combined signal to the plurality of second RF combiner and decombiner circuits.

The invention will be more fully understood upon consideration of the following detailed description, taken together with the accompanying drawings.

BRIEF DESCRIPTION OF THE DRAWINGS

Use of the same reference symbols in different figures indicates similar or identical items.

DETAILED DESCRIPTION

Reference will now be made in detail to one or more embodiments of the invention. While the invention will be described with respect to these embodiments, it should be understood that the invention is not limited to any particular embodiment. On the contrary, the invention includes alternatives, modifications, and equivalents as may come within the spirit and scope of the appended claims. Furthermore, in the following description, numerous specific details are set forth to provide a thorough understanding of the invention. The invention may be practiced without some or all of these specific details. In other instances, well-known structures and principles of operation have not been described in detail to avoid obscuring the invention.

The present invention provides a beamforming wireless repeater. This repeater utilizes and expands upon the beamforming capabilities described in co-pending U.S. Ser. Nos. 10/423,303, filed Apr. 25, 2003, Ser. No. 10/423,106, filed Apr. 25, 2003, Ser. No. 10/422,907, filed Apr. 25, 2003, Ser. No. 10/423,129, filed Apr. 25, 2003, and Ser. No. 10/942,383, filed Sep. 16, 2004, the contents of all of which are hereby incorporated by reference in their entirety.

Figure 1:
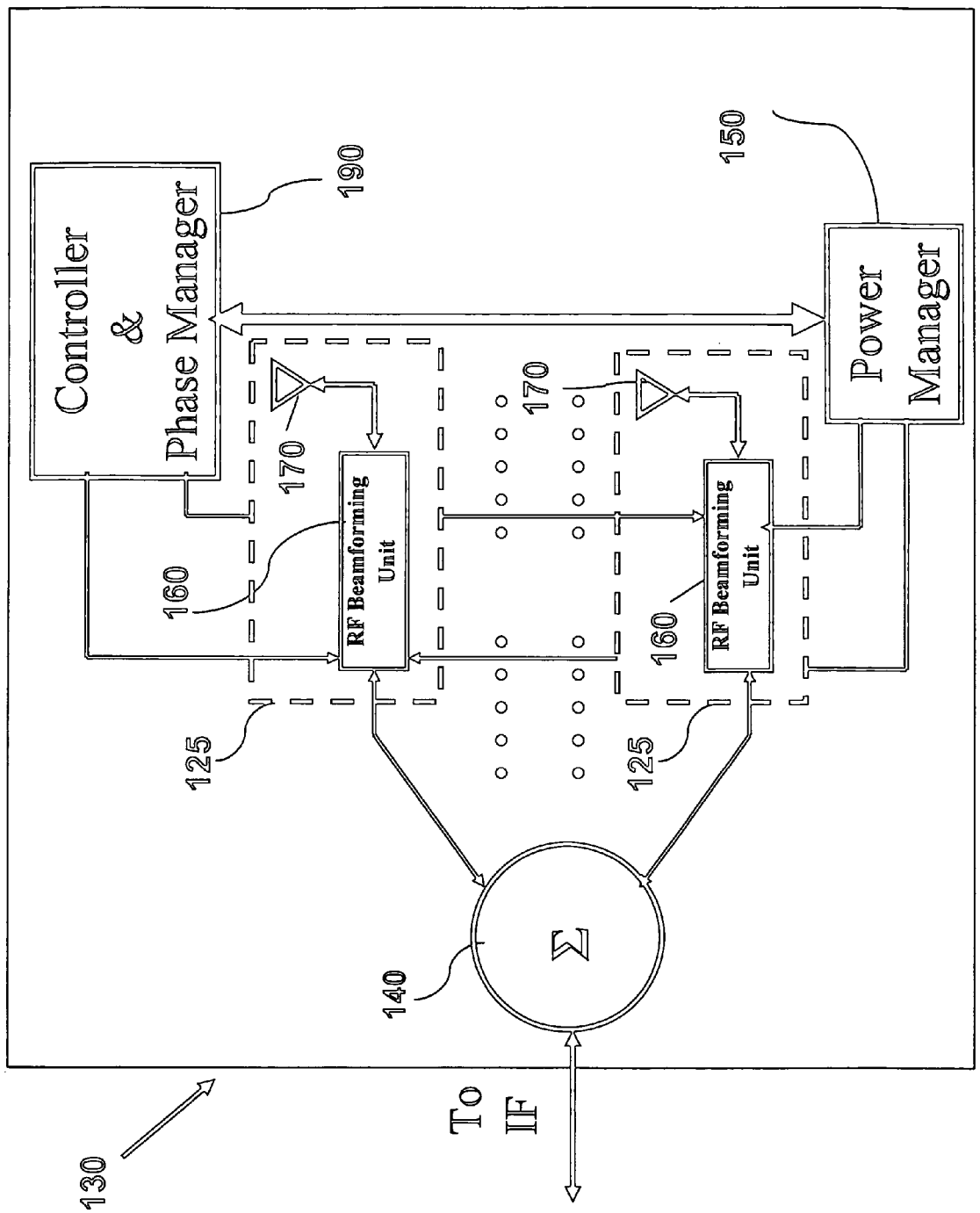
FIG. 1 is a block diagram of a beamforming antenna array in which the beamforming is performed in the RF domain.

One embodiment of a beamforming antenna system described in the above-mentioned applications is shown in FIG. 1, which illustrates an RF beamforming and controller unit 130. In this embodiment, the receive and transmit antenna arrays are the same such that each antenna 170 functions to both transmit and receive. A plurality of antenna circuits 125 each includes an RF beamforming interface circuit 160 and receive/transmit antenna 170. RF beamforming interface circuit 160 adjusts the phase and/or the amplitude of the received and transmitted RF signal responsive to control from a controller/phase manager circuit 190. Although illustrated having a one-to-one relationship between beamforming interface circuits 160 and antennas 170, it will be appreciated, however, that an antenna circuit 125 may include a plurality of antennas all driven by RF beamforming interface circuit 160.

Figure 2:
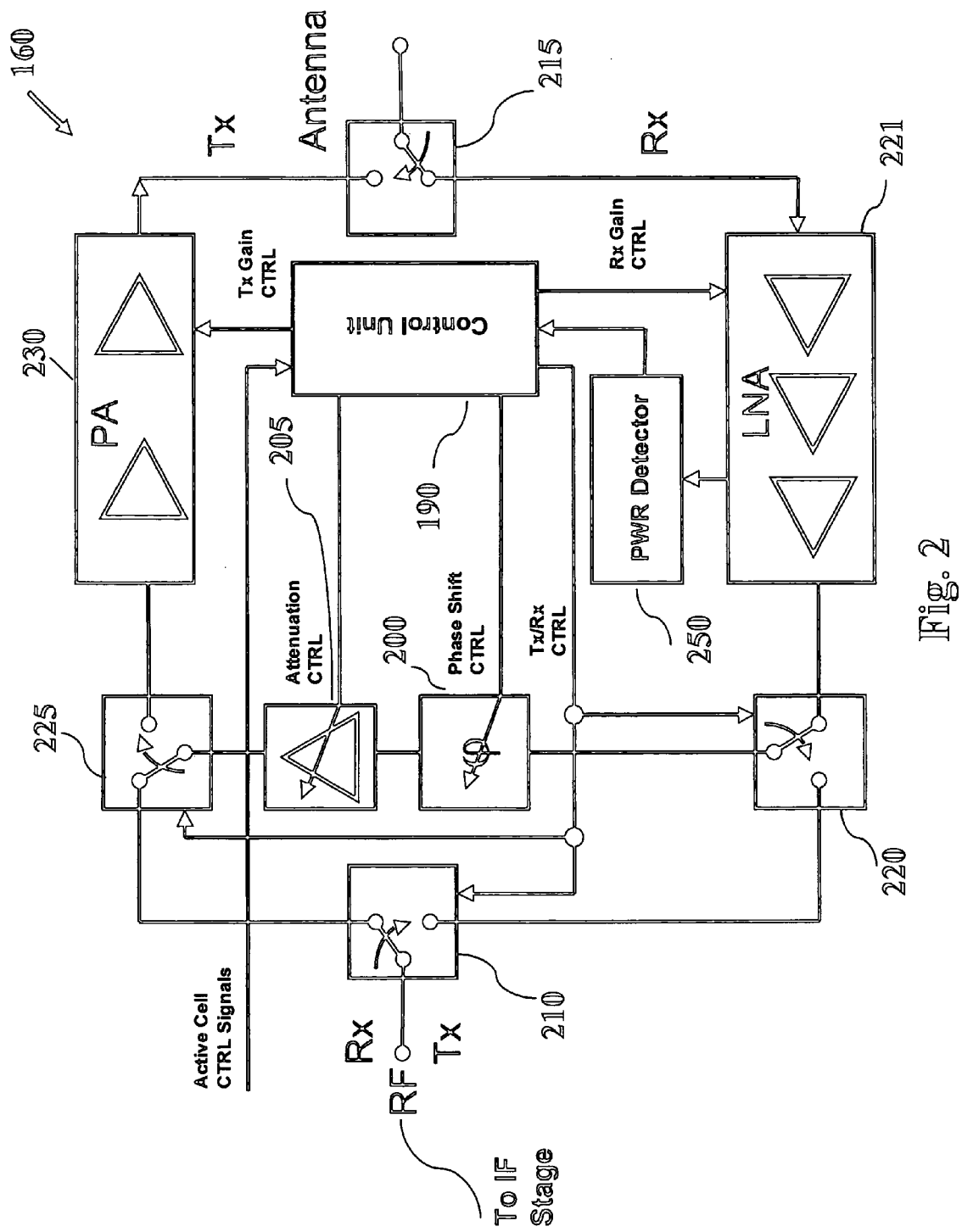
FIG. 2 is a schematic illustration of an RF beamforming interface circuit for the array of FIG. 1.

A circuit diagram for an exemplary embodiment of RF beamforming interface circuit 160 is shown in FIG. 2. Note that the beamforming performed by beamforming circuits 160 may be performed using either phase shifting, amplitude variation, or a combination of both phase shifting and amplitude variation. Accordingly, RF beamforming interface circuit 160 is shown including both a variable phase shifter 200 and a variable attenuator 205. It will be appreciated, however, that the inclusion of either phase shifter 200 or attenuator 205 will depend upon the type of beamforming being performed. To provide a compact design, RF beamforming circuit may include RF switches/multiplexers 210, 215, 220, and 225 so that phase shifter 200 and attenuator 205 may be used in either a receive or transmit configuration. For example, in a receive configuration RF switch 215 routes the received RF signal (from antenna 170 of FIG. 1) to a low noise amplifier 221. The resulting amplified signal is then routed by switch 220 to phase shifter 200 and/or attenuator 205. The phase shifting and/or attenuation provided by phase shifter 200 and attenuator 205 are under the control of controller/phase manager circuit 190. The resulting shifted signal routes through RF switch 225 to RF switch 210. RF switch 210 then routes the signal to IF processing circuitry (not illustrated).

In a transmit configuration, the RF signal received from IF processing circuitry (alternatively, a direct down-conversion architecture may be used to provide the RF signal) routes through RF switch 210 to RF switch 220, which in turn routes the RF signal to phase shifter 200 and/or attenuator 205. The resulting shifted signal is then routed through RF switch 225 to a power amplifier 230. The amplified RF signal then routes through RF switch 215 to antenna 170 (FIG. 1). It will be appreciated, however, that different configurations of switches may be implemented to provide this use of a single set of phase-shifter 200 and/or attenuator 205 in both the receive and transmit configuration. In addition, alternate embodiments of RF beamforming interface circuit 160 may be constructed not including switches 210, 220, and 225 such that the receive and transmit paths do not share phase shifter 200 and/or attenuator 205. In such embodiments, RF beamforming interface circuit 160 would include separate phase-shifters and/or attenuators for the receive and transmit paths.

Referring back to FIG. 1, to assist the beamforming capability, a power detector 150 functions as a received signal strength indicator to measure the power in the received RF signal. For example, power detector 150 may comprise a calibrated envelope detector. As seen in FIG. 2, a power manager 250 may detect the peak power determined by the various power detectors 150 within each antenna circuit 125. The antenna circuit 125 having the peak detected power may be denoted as the "master" antenna circuit. Power manager 250 may then determine the relative delays for the envelopes for the RF signals from the remaining antenna circuits 125 with respect to the envelope for the master antenna circuit 125. To transmit in the same direction as this received RF signal, controller/phase manager 190 may determine the phases corresponding to these detected delays and command the transmitted phase shifts/attenuations accordingly. Alternatively, a desired receive or transmit beamforming direction may simply be commanded by controller/phase manager 190 rather than derived from a received signal. In such embodiment, power managers 150 and 250 need not be included since phasing information will not be derived from a received RF signal.

Regardless of whether integrated antenna circuits 125 perform their beamforming using phase shifting and/or amplitude variation, the shifting and/or variation is performed on the RF signal received either from the IF stage (in a transmit mode) or from its antenna 170 (in a receive mode). By performing the beamforming directly in the RF domain as discussed with respect to FIGS. 1 and 2, substantial savings are introduced over a system that performs its beamforming in the IF or baseband domain. Such IF or baseband systems must include A/D converters for each RF channel being processed. In contrast, the system shown in FIG. 1 may supply a combined RF signal from an adder 140. From an IF standpoint, it is just processing a single RF channel for the system of FIG. 1, thereby requiring just a single A/D. Accordingly, the following discussion will assume that the beamforming is performed in the RF domain. The injection of phase and/or attenuation control signals by controller/phase manager circuit 190 into each integrated antenna circuit 125 may be performed inductively as discussed in U.S. Ser. No. 10/423,129.

The beamforming in the RF domain approach discussed with regard to FIGS. 1 and 2 may be implemented in an alternative embodiment as discussed in U.S. Ser. No. 10/860,526 (the '526 application). In this alternative embodiment, each antenna circuit 125 may be replaced by a corresponding oscillator/antenna unit, wherein each oscillator/antenna unit includes a phase-locked loop (PLL) and a corresponding antenna and mixer. Each PLL is operable to receive a reference signal and provide a frequency-shifted signal output signal that is synchronous with the reference signal. Should an integrated oscillator/antenna unit be configured for transmission, its output signal is upconverted in the unit's mixer and the upconverted signal transmitted by the corresponding antenna. Alternatively, should an integrated oscillator/antenna unit be configured for reception, a received RF signal from the unit's antenna is downconverted in the mixer responsive to the frequency-shifted output signal from the PLL. As further described in the '526 application, the beamforming provided by an array of integrated oscillator/antenna units may be programmably controlled by a phase sequencer that controls the reference clocks provided to a "slave" subset of the integrated oscillator/antenna units. A "master" integrated oscillator/antenna unit receives a reference clock as its reference signal such that the reference clocks provided to the slave subset are phase-shifted versions of the reference clock. Although the programmable phase shifting described in the '526 application may be utilized in the present invention, the resulting beamforming is performed in the mixer block rather than in the RF domain. By performing the beamforming directly in the RF domain as discussed with respect to FIGS. 1 and 2, substantial savings are introduced. Thus, the following discussion will assume that the beamforming is performed in the RF domain. However, it will be appreciated that embodiments of the present invention may be implemented using the mixer domain approach of the '526 application.

Figure 3:
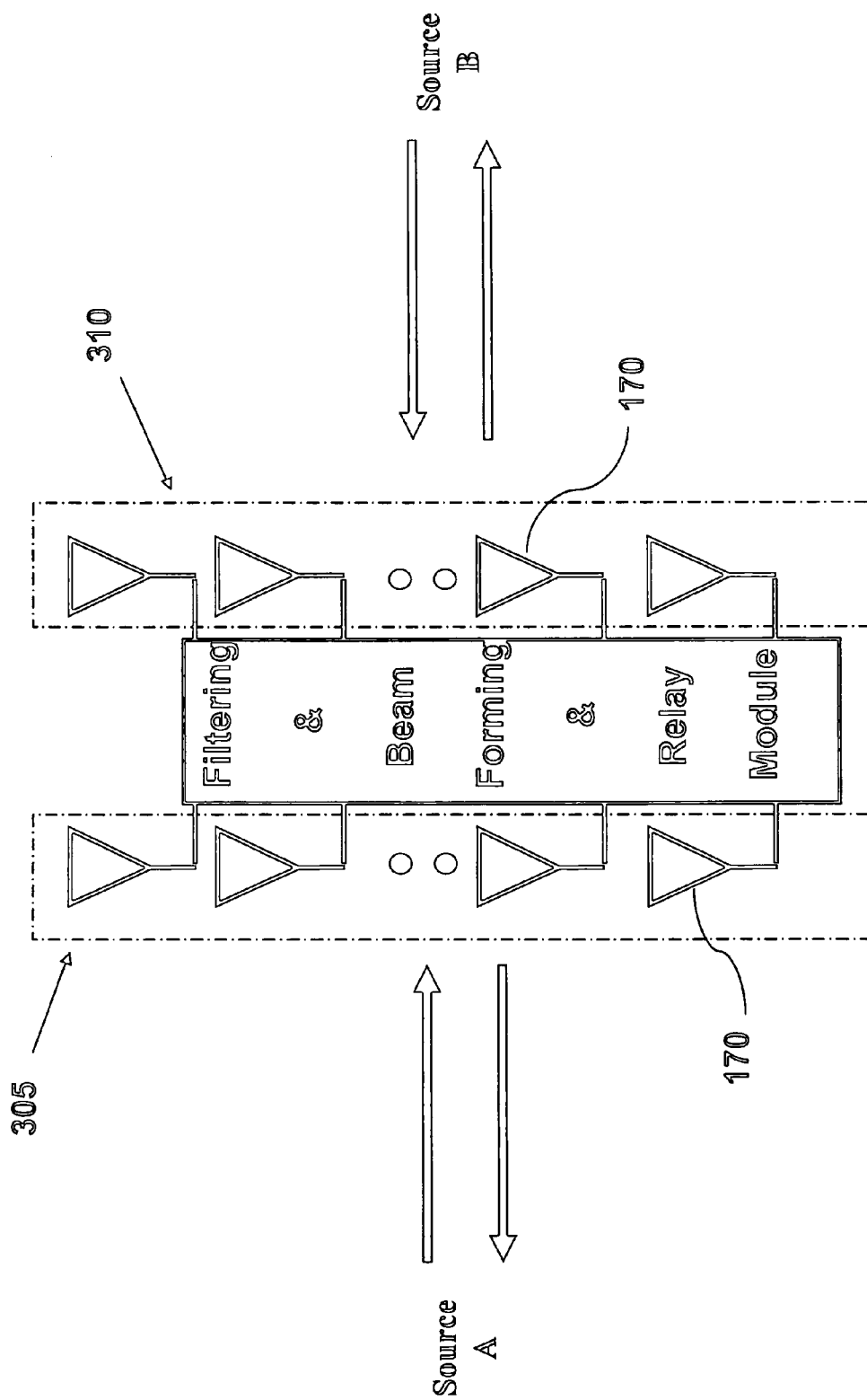
FIG. 3 is a block level illustration of a beamforming wireless repeater in accordance with an embodiment of the invention.

A beamforming wireless repeater 300 is illustrated in FIG. 3. Advantageously, because the beamforming is implemented in the RF domain (or mixer domain) as discussed above, wireless repeater 300 does not need to demodulate the received RF signals, for example, for processing at the MAC layer or other baseband processes. In this fashion, wireless repeater 300 is independent of the communication protocol implemented for the repeated RF signals. Because the communication protocol is transparent to wireless repeater 300, there is no need for costly and complex digital signal processing and associated protocol management. Thus, the manufacture of wireless repeater 300 is simplified, thereby enabling a low-cost wireless repeater solution. For example, conventional off-the-shelf phase shifters and amplifiers may be incorporated into wireless repeater 300.

Wireless repeater 300 includes at least two antenna arrays. Each antenna array may be used to receive and transmit in a desired direction, depending upon the relative position of the source for the RF signals to be repeated. For example, an array 305 of antennas 170 beamforms with respect to a source A whereas an array 310 beamforms with respect to a source B. Each array may be implemented using any suitable antenna topology such as, for example, dipole or patch antennas. A beamforming and relay module 320 couples between arrays 305 and 310. Relay module 320 may be implemented to support either full-duplex repeating or half-duplex repeating. A full-duplex implementation will be discussed first.

Figure 4:
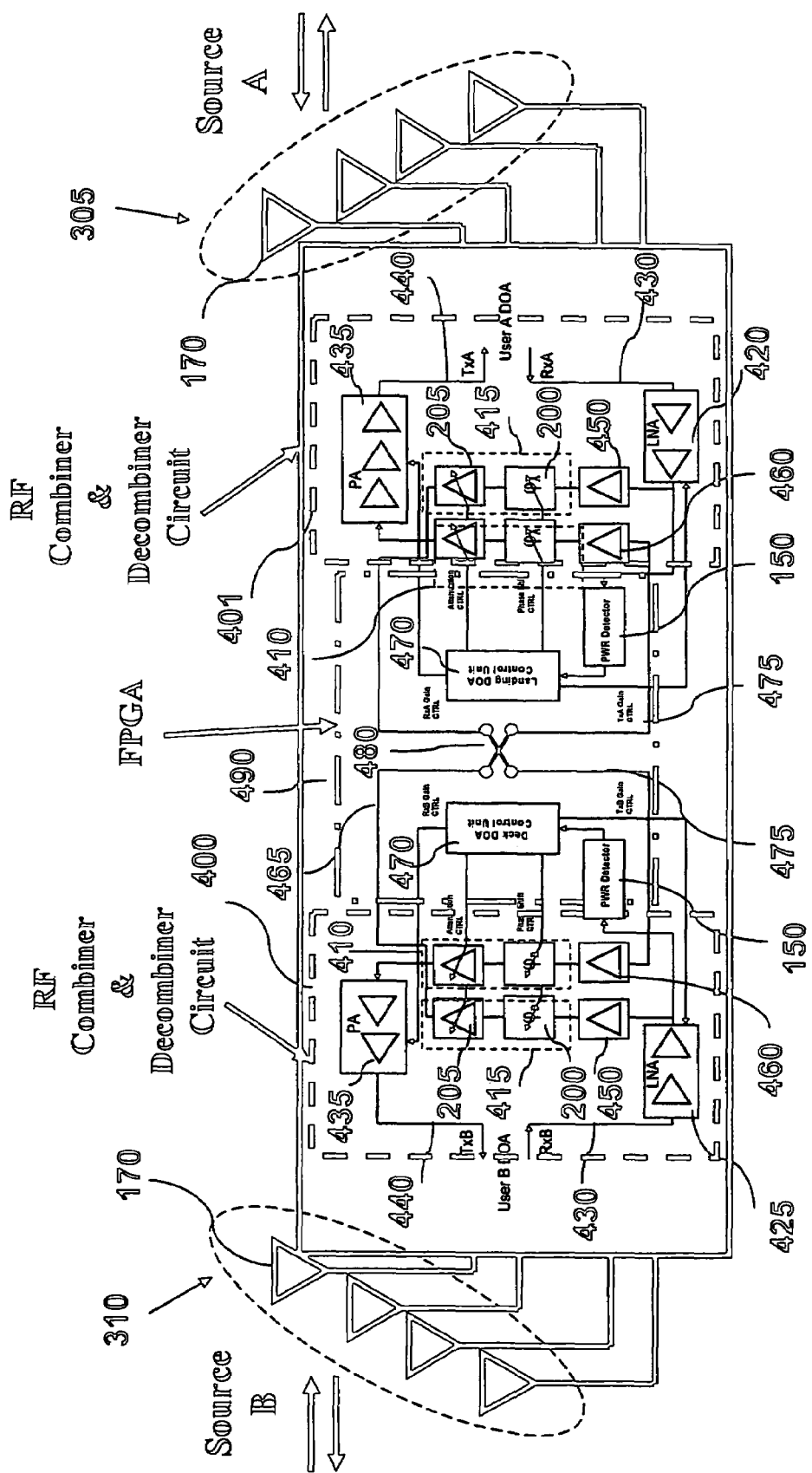
FIG. 4 is a schematic illustration of a full-duplex beamforming wireless repeater in accordance with an embodiment of the invention.

Turning now to FIG. 4, a circuit diagram for a full-duplex module 320 is illustrated. Because the repeating is full-duplex through module 320, module 320 may be simultaneously transmitting and receiving with respect to each source. Each array 310 and 305 is coupled to a corresponding RF combiner and decombiner circuit 400 and 401, respectively. PT combiner and decombiner circuits 400 and 401 are implemented analogously as discussed with respect to RF beamforming interface circuit 160 (FIGS. 1 and 2). Thus, each RF combiner and decombiner circuit may use phase-shifting and/or amplitude variation such that the corresponding array beamforms in the direction of the desired source. For example, with respect to array 310 and source B, RF combiner and decombiner circuit 400 includes a transmitting pair 410 of phase-shifter 200 and/or variable attenuator 205 as well as a receiving pair 415 of phase-shifter 200 and/or variable attenuator 205. For illustration clarity, only a single transmitting pair 410 and receiving pair 415 is illustrated. However, it will be appreciated that at least two transmitting pairs and receiving pairs would be required so that beamforming may be accomplished. The number of antennas coupled to each transmitting and receiving pair may be varied according to design needs. For example, having each antenna 170 associate with its own transmitting and receiving pair provides the most capability with regard to beamforming. However, such an approach requires more components and thus is associated with relatively higher manufacturing costs. In contrast, having subsets of antennas 170 in each array share a transmitting and receiving pair decreases beamforming capability but lowers manufacturing costs.

Regardless of the particular compromise that is achieved between beamforming capability and manufacturing costs, a subset of one or more antennas couples to a corresponding RF combiner and decombiner circuit. However, for illustration clarity, only RF combiner and decombiner circuit 400 is shown coupling to array 310. Similarly, only RF combiner and decombiner circuit 401 is shown coupling to array 305. Within each RF combiner and decombiner circuit, a low noise amplifier (LNA) 420 may coupled between a receive RF channel 430 and receiving pair 415. To provide isolation and impedance matching, a buffer 450 may couple between receiving pair 415 and LNA 420. With respect to a transmit channel 440, a power amplifier 435 may couple between transmitting pair 410 and transmit channel 440. A buffer 460 performs analogously to buffer 450. As discussed with respect to RF beamforming interface circuit 160, a power detector 150 such as an envelope detector provides a measure of the received RF power carried through RF receive channel 430. A direction-of-arrival (DOA) control circuit 470 corresponding to each array determines the receive channel having the maximum power. In addition, DOA control circuit 470 determines the phasing of the other receive channels with respect to the maximum power channel. In embodiments having only a phase shifter 200 in each receive pair 415, DOA control circuit 470 may command the other receive channels to phase shift with a conjugate phase so that the received signal power is maximized. Alternatively, a combination of phasing and attenuation may be commanded to achieve the same goal. This same phasing and/or attenuation is applied to the transmit path as well. In addition to performing beamforming, DOA control circuits 470 may command for maximal ratio combining using the complex conjugates of channel transfer characteristics as known in the communication arts.

With respect to each array, a single RF channel 465 is formed from the corresponding RF combiner and decombiner circuits as discussed analogously with regard to adder 140 of FIG. 1. To provide the repeater function, a cross-connect switch couples the received RF signal in each array's RF channel 465 into a transmit channel 475 that provides the RF signal to transmit pairs 410 as discussed previously. The logic necessary to implement each DOA control circuit 470 may be implemented in, for example, a field programmable gate array (FPGA) 490.

Figure 5:
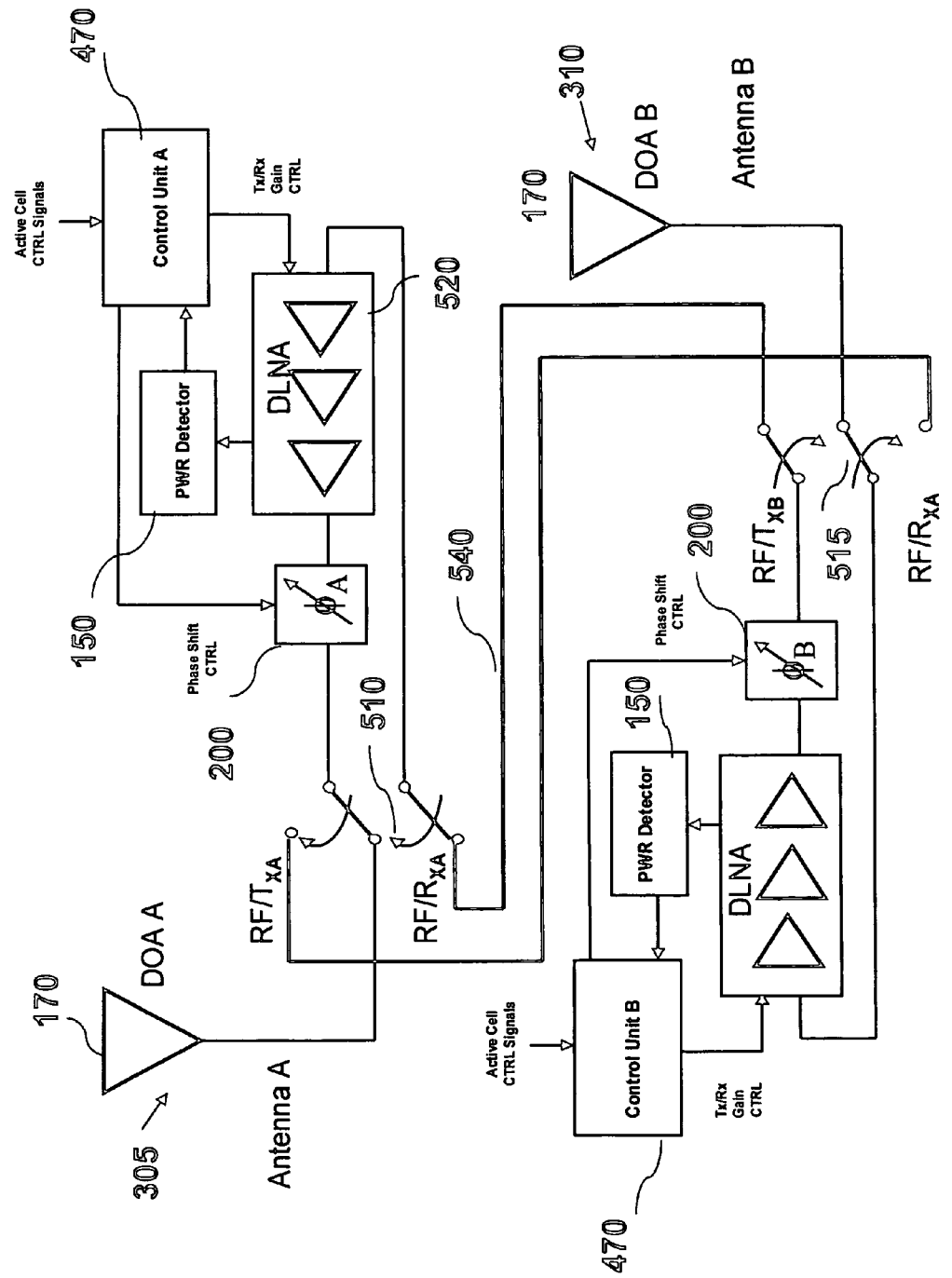
FIG. 5 a schematic illustration of a half-duplex beamforming wireless repeater in accordance with an embodiment of the invention.

A half-duplex wireless repeater 500 is illustrated in FIG. 5. For illustration clarity, each array 310 and 305 is shown using a single antenna element 170. Because of the half-duplex operation, a single phase-shifter 200 may be used for each sub-array of antenna elements 170 in both the receive and transmit directions through operation of RF switches 510 and 515. Switch 510 is configured for transmission. Thus, an RF signal repeated from array 310 is provided to a low noise amplifier 520. In an integrated circuit embodiment, low noise amplifier 520 may be implemented as distributed low noise amplifier as disclosed in U.S. Ser. No. 11/141,283, entitled "Wafer Scale Beam Forming Antenna Module With Distributed Amplification, filed May 31, 2005, the contents of which are hereby incorporated by reference. Low noise amplifier 520 provides an amplified signal to phase shifter 200 under the control of DOA control circuit 470. The resulting amplified and phase-shifted RF signal is transmitted by the corresponding sub-array of antennas 170 in array 305. In a receive configuration, RF signal from the corresponding sub-array would couple through RF switch 510 to LNA 520 and phase-shifter 200. The resulting amplified and phase-shifted signal would then be combined into a single RF channel 540 so that it may be repeated through array 310.

Figure 6:
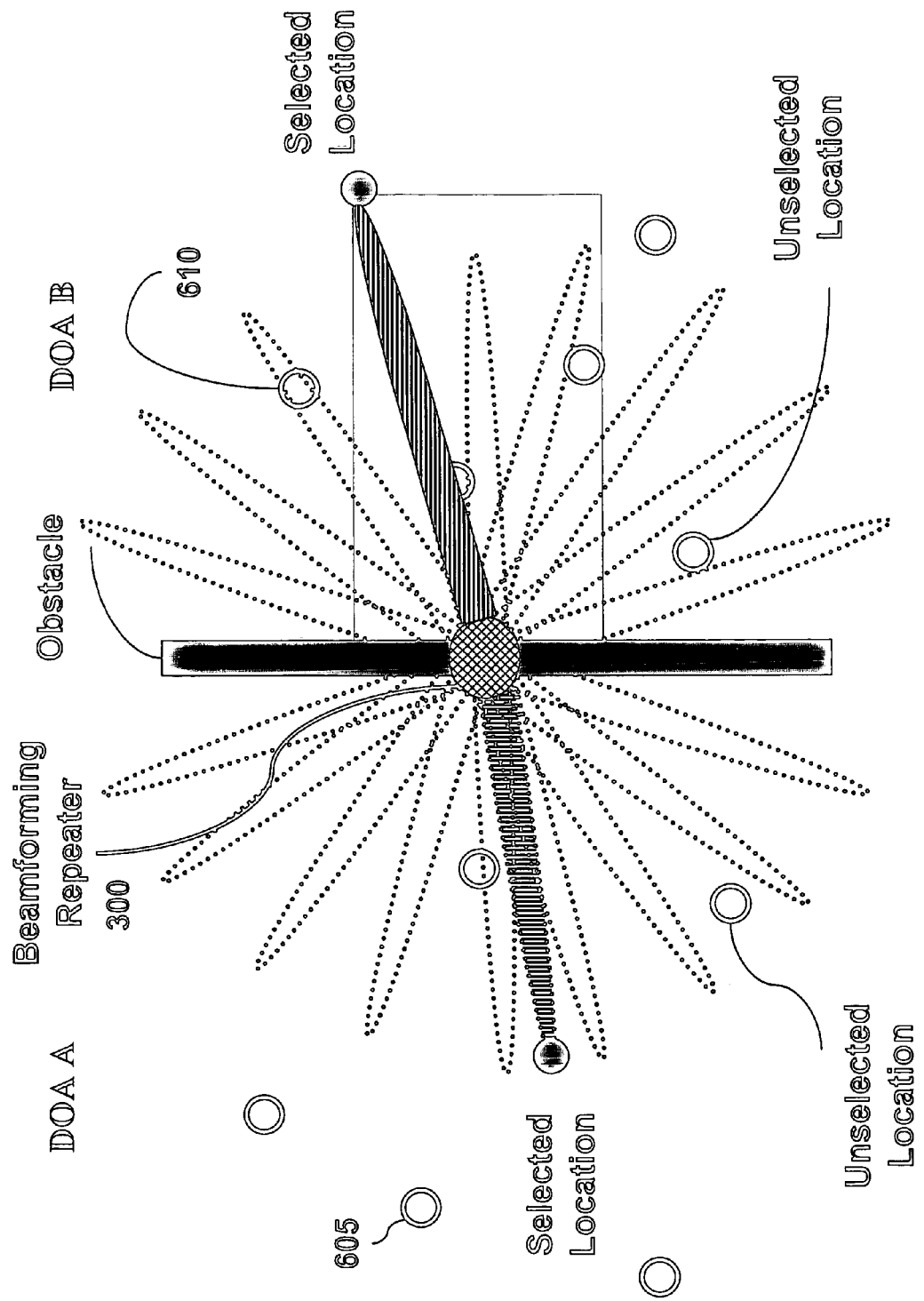
FIG. 6 illustrates the beamforming capabilities of a wireless repeater in accordance with an embodiment of the invention.

Regardless of whether full-duplex or half-duplex operation is enabled, no baseband processing need be performed as discussed above. Instead, only the users at sources A and B need perform any baseband processing. Thus, manufacturing costs are minimized. Despite the low cost, however, a user may advantageously communicate over non-line-of-sight paths with enhanced signal clarity and bit error rates. For example, as illustrated in FIG. 6, a user A may be located at any one of locations 605. Similarly, a user B may be located at any one of locations 610. An obstacle prevents conventional line-of-sight communication between these users. However, a wireless repeater 300 communication between any of locations 605 and 610 through appropriate actuation of potential beamforming directions 620. In this fashion, virtual line-of-sight communication is enabled despite the presence of the obstacle to such communication.

Figure 7:
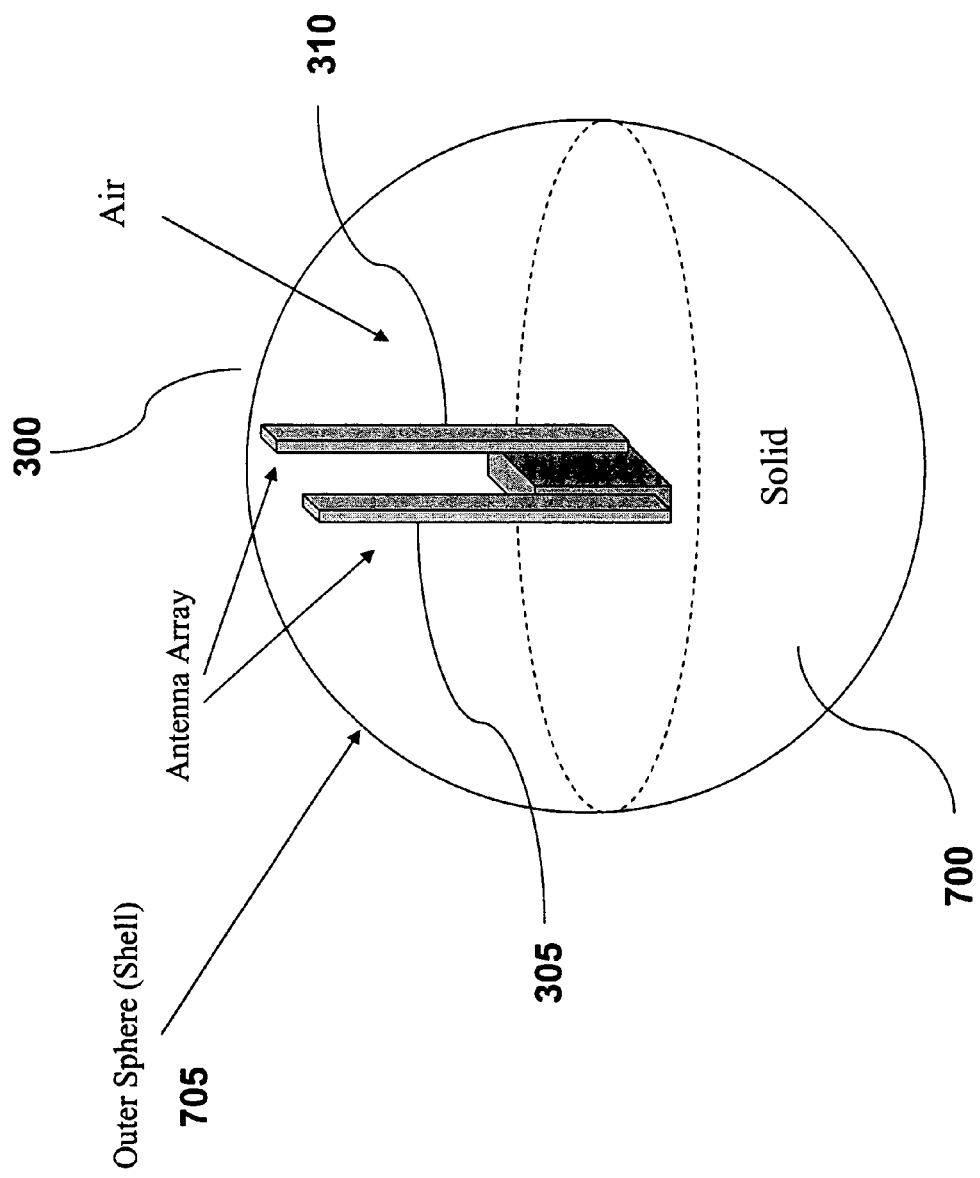
FIG. 7 illustrates a vertically self-positioning beamforming wireless repeater in accordance with an embodiment of the invention.

The wireless repeaters disclosed herein may be implemented using discrete components or in an integrated circuit approach such as disclosed in U.S. Ser. No. 11/141,283. Because of the low-cost nature of wireless repeater 300, it may be mass produced for field implementation in relation to covert or military operations. For example, wireless repeaters 300 may be battery-powered and widely distributed across a field of operation. As seen in FIG. 6, the array corresponding to each user/RF source should be oriented appropriately. To enable an automatic self-orientation of the arrays, each wireless repeater 300 may be integrated with a weight 700 into an approximately spherical package 705 as illustrated in FIG. 7. Package 700 may thus be randomly oriented prior to placement but will roll until weight 700 is closest to the ground. Alternatively, package 700 may be movably mounted within an frame (not illustrated) such that such movement would be internal to the device. In this fashion, arrays 305 and 310 will be oriented vertically so that they may most efficiently beamform to their respective users.

The above-described embodiments of the present invention are merely meant to be illustrative and not limiting. For example, although the wireless repeaters may be agnostic with respect to the communication protocol of the repeated signals, the beamforming wireless repeaters disclosed herein may also be configured with baseband processors. Although such demodulation adds to the complexity of the design, it enables a layer 3 routing ability in that the wireless repeater could then act as a router. It will thus be obvious to those skilled in the art that various changes and modifications may be made without departing from this invention in its broader aspects. The appended claims encompass all such changes and modifications as fall within the true spirit and scope of this invention.

I claim:

1. A beamforming RF repeater, comprising:
    a beamforming controller;
    a first array of antennas organized into a plurality of first sub-arrays;
    a plurality of first RF combiner and decombiner circuits corresponding to the plurality of first sub-arrays, each first RF combiner and decombiner circuit receiving an RF signal from the corresponding first sub-array of antennas,
    a plurality of first power detectors corresponding to the plurality of first RF combiner and decombiner circuits, each first power detector configured to determine a power of the received RF signal in the corresponding first RF combiner and decombiner circuit, the beamforming controller determining a first beamforming command responsive to the measured powers from the first power detectors, wherein each first RF combiner and decombiner circuit is configured to phase shift in the RF domain the received RF signal from the corresponding first sub-array according to the first beamforming command from the beamforming controller such that a first combined signal formed from the phase-shifted signals from the plurality of first RF combiner and decombiner circuits is received in a first desired beam direction;
    a second array of antennas organized into a plurality of second sub-arrays; and
    a plurality of second RF combiner and decombiner circuits corresponding to the plurality of second sub-arrays, wherein each second RF combiner and decombiner circuit is configured to phase shift in the RF domain the first combined signal according to a second beamforming command from the beamforming controller such that a transmitted signal from the second array of antennas is transmitted in a second desired beam direction.

2. The beamforming RF repeater of claim 1, wherein each second RF combiner and decombiner circuit is configured to phase shift in the RF domain a received RF signal from the corresponding second sub-array according to the second beamforming command such that a second combined signal formed from the phase-shifted signals from the plurality of second RF combiner and decombiner circuits is received in the second desired beam direction, and wherein each first RF combiner and decombiner circuit is configured to phase shift in the RF domain the second combined signal according to the first beamforming command such that a transmitted signal from the first array of antennas is transmitted in the first desired beam direction.

3. The beamforming repeater of claim 2, wherein each first and second RF combiner and decombiner circuit includes only a single phase shifter such that only half-duplex operation is enabled.

4. The beamforming controller of claim 3, wherein each first and second RF combiner and decombiner circuit includes an RF switch having a receive and transmit configuration corresponding to the half-duplex operation.

5. The beamforming repeater of claim 2, wherein each first and second RF combiner and decombiner circuit includes a phase shifter for its received signal and a phase shifter for its transmitted signal such that a full-duplex operation is enabled.

6. The beamforming repeater of claim 2, further comprising a second power detector corresponding to each second RF combiner and decombiner circuit, each second power detector configured to determine a power of the received RF signal in the corresponding second RF combiner and decombiner circuit, the beamforming controller determining the second beamforming command responsive to the measured powers from the second power detectors.

7. The beamforming repeater of claim 2, wherein the beamforming controller is implemented in a field programmable gate array.

8. The beamforming repeater of claim 2, wherein the second combined signal couples to the plurality of first RF combiner and decombiner circuits without any baseband processing.

9. The beamforming repeater of claim 2, further comprising a baseband processor configured to process the second combined signal.

10. The beamforming repeater of claim 1, wherein the first combined signal couples to the plurality of second RF combiner and decombiner circuits without any baseband processing.

11. The beamforming repeater of claim 1, further comprising a baseband processor configured to process the first combined signal.

12. The beamforming repeater of claim 1, further comprising a weight coupled to the first and second arrays, wherein the beamforming repeater is contained within a package such that the weight orients the first and second arrays vertically with respect to the ground.

13. The beamforming repeater of claim 1, wherein the package is substantially spherical.

14. The beamforming repeater of claim 13, wherein the weight is substantially hemispherical.

* * * * *